(12) United States Patent
Fujii et al.

(10) Patent No.: US 9,010,151 B2
(45) Date of Patent: Apr. 21, 2015

(54) GLASS SHEET CUTTING METHOD

(75) Inventors: Takahide Fujii, Shiga (JP); Setsuo Uchida, Shiga (JP); Naotoshi Inayama, Shiga (JP); Takayuki Noda, Shiga (JP); Sho Itoh, Shiga (JP); Michiharu Eta, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 290 days.

(21) Appl. No.: 13/617,844

(22) Filed: Sep. 14, 2012

(65) Prior Publication Data

US 2013/0091897 A1  Apr. 18, 2013

(30) Foreign Application Priority Data

Sep. 15, 2011  (JP) ................. 2011-202143
Sep. 15, 2011  (JP) ................. 2011-202144
Sep. 16, 2011  (JP) ................. 2011-203300

(51) Int. Cl.

| | | |
|---|---|---|
| *C03B 33/09* | (2006.01) | |
| *C03B 33/02* | (2006.01) | |
| *C03B 33/08* | (2006.01) | |
| *C03B 25/08* | (2006.01) | |
| *B23K 26/40* | (2014.01) | |
| *B23K 26/30* | (2014.01) | |

(52) U.S. Cl.
CPC ........... *C03B 33/0222* (2013.01); *C03B 33/082* (2013.01); *C03B 25/08* (2013.01); *B23K 26/4075* (2013.01); *B23K 26/422* (2013.01)

(58) Field of Classification Search
CPC .... C03B 33/09; C03B 33/091; C03B 33/093; C03B 33/0222; C03B 33/082; C03B 33/102; C03B 25/025; C03C 23/0025
USPC ........................ 65/95, 97, 112, 117
See application file for complete search history.

(56) References Cited

U.S. PATENT DOCUMENTS

| | | | | |
|---|---|---|---|---|
| 3,453,097 | A * | 7/1969 | Hafner ............................ | 65/112 |
| 3,885,943 | A * | 5/1975 | Chui ................................ | 65/97 |
| 5,779,753 | A * | 7/1998 | Vetter et al. .................... | 65/105 |
| 6,545,248 | B2* | 4/2003 | Tanaka et al. ............ | 219/121.65 |

(Continued)

FOREIGN PATENT DOCUMENTS

| | | |
|---|---|---|
| CN | 1491144 | 4/2004 |
| CN | 101444875 | 6/2009 |

(Continued)

OTHER PUBLICATIONS

International Search Report issued Dec. 18, 2012 in International (PCT) Application No. PCT/JP2012/073718.

(Continued)

*Primary Examiner* — Joseph S Del Sole
*Assistant Examiner* — Russell Kemmerle, III
(74) *Attorney, Agent, or Firm* — Wenderoth

(57) ABSTRACT

A glass sheet cutting device fuses and divides a glass substrate using a preset cutting line as a boundary while supplying an assist gas and a laser beam from above the glass substrate along the preset cutting line of the glass substrate. The glass sheet cutting device includes a first laser irradiator for radiating a fusing laser beam and a second laser irradiator for radiating an annealing laser beam. Through a fusing gap formed between fused end surfaces by fusing, the second laser irradiator radiates the annealing laser beam obliquely from above onto the fused end surface to be annealed.

19 Claims, 8 Drawing Sheets

(56) References Cited

U.S. PATENT DOCUMENTS

| | | | |
|---|---|---|---|
| 7,820,941 B2* | 10/2010 | Brown et al. | 219/121.69 |
| 2002/0134765 A1* | 9/2002 | Tanaka et al. | 219/121.6 |
| 2009/0159580 A1 | 6/2009 | Hsu et al. | |
| 2010/0078417 A1 | 4/2010 | Abramov et al. | |
| 2013/0122264 A1* | 5/2013 | Fujii et al. | 428/192 |

FOREIGN PATENT DOCUMENTS

| | | |
|---|---|---|
| CN | 101468875 | 7/2009 |
| CN | 101712529 | 5/2010 |
| DE | 10 2007 008 634 | 8/2008 |
| JP | 60-251138 | 12/1985 |
| JP | 2002-178179 | 6/2002 |
| JP | 2006-273695 | 10/2006 |
| JP | 2007-301624 | 11/2007 |
| JP | 2009-35433 | 2/2009 |
| JP | 2011-104633 | 6/2011 |
| KR | 10-2009-0033085 | 4/2009 |

OTHER PUBLICATIONS

International Preliminary Report on Patentability and Written Opinion of the International Searching Authority issued Mar. 27, 2014 in International (PCT) Application No. PCT/JP2012/073718.

Office Action issued Sep. 22, 2014 in corresponding Chinese patent application No. 201280029808.1 (with partial English translation).

* cited by examiner

GLASS SHEET CUTTING METHOD

BACKGROUND OF INVENTION

1. Technical Field

The present invention relates to an improvement of a cutting technology for fusing glass sheets.

2. Background Art

Conventionally, as a glass sheet cutting method, there have been employed a method in which a glass sheet is cleaved in such a manner that a scribe line is formed in a surface of the glass sheet and then a bending stress is applied to the scribe line (cleaving using a bending stress), and laser cleaving in which a glass sheet is cleaved in such a manner that an initial crack is formed in the glass sheet and then the initial crack is propagated by irradiation heat of a laser beam (cleaving using a thermal stress).

However, the cleaving using a bending stress has a problem in that it is impossible to avoid occurrence of minute glass powder and to easily remove the minute glass powder even in washing performed after cutting. This problem is critical particularly in a glass substrate for use in a display and the like that are required to have a high level of cleanness. Further, in the cleaving using a bending stress, a cut end portion of the glass sheet has an angular shape, and hence a defect such as a chip easily occurs. Accordingly, it is necessary to perform chamfering on the cut end portion of the glass sheet after cutting.

On the other hand, in the laser cleaving, it is possible to cleave the glass sheet with little defect, but it is extremely difficult to avoid contact between cut end surfaces of the glass sheet when dividing the glass sheet into cleaved pieces. Accordingly, at the time of the dividing, due to rubbing between the cut end surfaces of the glass sheet or the like, a minute defect may be formed in the cut end surfaces. Further, even in the laser cleaving, similarly to the above-mentioned cleaving using a bending stress, the cut end portion of the glass sheet has an angular shape, and hence it is necessary to perform chamfering after cutting.

As a cutting method capable of coping with the above-mentioned problems, laser fusing attracts attention.

The laser fusing is a method of cutting a glass sheet while melting and removing a part of a glass substrate with irradiation heat of a laser beam. Accordingly, the laser fusing can prevent occurrence of glass powder. Further, an unnecessary part of glass is molten and removed, and thus a predetermined clearance is formed between fused end surfaces (cut end surfaces). With this, it is possible to reliably avoid such a situation that the fused end surfaces of the glass sheet come into contact with each other at the time of dividing. In addition, the fused end surfaces are molten and formed into smooth fire-polished surfaces, and hence even without performing chamfering on the fused end surfaces separately, the glass sheet is less likely to be damaged.

However, even the laser fusing still has a problem in actual use.

That is, fusing of the glass sheet with a laser beam has a problem in that an excessive thermal stress accompanied with sharp temperature rise is applied to a vicinity of a region irradiated with the laser beam, and a problem in that a thermal residual strain occurs in vicinities of the fused end surfaces. In a case where influences of those problems are significant, the glass sheet may be deformed due to warpage or the like, or may break.

In this context, for example, Patent Literature 1 discloses the following. Specifically, after the glass substrate is preheated by the defocused laser beam, the glass sheet is fused with the laser beam focused at the micro point, and is then annealed again with the defocused laser beam. In this manner, a thermal strain is reduced.

Note that, in Patent Literature 1, similarly to the fusing laser beam, the annealing laser beam is vertically radiated directly from above onto the glass sheet.

Further, in Patent Literature 1, the output end of the preheating laser beam, the output end of the fusing laser beam, and the output end of the annealing laser beam (laser irradiators) are arrayed above the preset cutting line of the glass substrate, and the regions to be irradiated with the respective laser beams are spaced apart from one another at certain intervals.

CITATION LIST

Patent Literature 1: JP 60-251138 A

Technical Problems

<First Object>

However, in the case of Patent Literature 1, the annealing laser beam vertically enters the upper surface of the glass sheet directly from above the glass sheet, and hence a thermal influence caused by the laser beam inevitably acts mostly on the upper surface side of the glass sheet. As a result, the whole fused end surfaces of the glass sheet cannot be annealed satisfactorily, and during fusing of the glass sheet or after fusing of the glass sheet, deformation such as warpage may still occur in the glass sheet due to an influence of the thermal residual strain.

Note that, it is conceivable that, instead of performing annealing along with fusing during the fusing in the above-mentioned manner, annealing is performed individually on the fused end surfaces of the glass sheet, which are divided after completion of fusing. However, in this case, the following problem arises. That is, in recent years, thinning of glass sheets, including glass substrates for use in a display, has been actually promoted. Once deformation such as warpage occurs in the glass sheet during fusing, the glass sheet may break at the time of subsequent handling, or the glass sheet may break in some cases at the point in time at which deformation occurs. Therefore, in consideration of a demand for thinning of glass sheets, it is important to perform annealing along with fusing during the fusing.

In view of the above-mentioned circumstances, the present invention has a first object to reliably anneal the fused end surfaces of the glass sheet when performing fusing on the glass sheet and performing annealing thereon along with the fusing, to thereby reduce as much as possible such a situation that deformation such as warpage occurs in the glass sheet.

<Second Object>

Further, in Patent Literature 1, the respective regions, which are irradiated by three laser irradiators arrayed in a space above the glass sheet, are spaced apart from one another at certain intervals, and hence a loss of supplied thermal energy may occur among the respective irradiation regions. It is necessary to heat the glass sheet to higher temperature in the irradiation region to be preheated and the irradiation region to be fused. Thus, when the thermal energy is lost between the two regions, a preheating effect is reduced and the thermal energy is wasted. Further, when the preheating effect is reduced, a range of temperature rise of the glass sheet at the time of fusing is increased, and hence the glass sheet may break due to thermal shock. In addition, when the irradiation region to be fused and the irradiation region to be annealed are apart from each other, the thermal energy is lost also between the two regions. Accordingly, a part of the glass sheet fused between the two regions is sharply cooled, and hence the glass sheet may break due to thermal shock.

SUMMARY OF INVENTION

In view of the above-mentioned circumstances, the present invention has a second object to reliably prevent breakage of the glass sheet and occurrence of the thermal residual strain through reducing as much as possible a loss of thermal energy which is applied at the time of preheating and annealing performed before and after fusing.

Solution to Problems

<First Invention>

According to a first invention devised to achieve the above-mentioned first object, there is provided a glass sheet cutting method, comprising: radiating a laser beam from above along a preset cutting line of a glass sheet; and fusing and dividing the glass sheet using the preset cutting line as a boundary, wherein the laser beam comprises: a fusing laser beam for fusing the glass sheet; and an annealing laser beam for annealing fused end surfaces of the glass sheet, and wherein the annealing laser beam is obliquely radiated from above onto at least one of the fused end surfaces to be annealed through a gap that is formed between the fused end surfaces by the fusing.

According to this method, the annealing laser beam is obliquely radiated onto at least one fused end surface to be annealed with use of the gap that is formed between the fused end surfaces by the fusing. Accordingly, unlike a case where the annealing laser beam is vertically radiated onto the glass sheet, an influence of irradiation heat of the annealing laser beam does not extremely act mostly on an upper surface of the glass sheet. In addition, the annealing laser beam is directly radiated onto a part or whole of the fused end surface, and hence the irradiation heat is easily transferred to the whole fused end surface. Therefore, it is possible to reliably anneal the whole fused end surface.

In the above-mentioned method, it is preferred that a region irradiated with the annealing laser beam have an intensity distribution in which an intensity of thermal energy changes from a fusing execution portion to a fusing completed portion on the preset cutting line. In particular, it is more preferred that the region irradiated with the annealing laser beam have an intensity distribution (temperature gradient) in which the intensity of thermal energy decreases from the fusing execution portion to the fusing completed portion. The fusing execution portion herein means a portion in which fusing is being performed with the fusing laser beam, and the fusing completed portion herein means a portion in which the fusing performed with the fusing laser beam is completed.

According to this, the influence of the irradiation heat of the annealing laser beam can be varied from the fusing execution portion to the fusing completed portion on the preset cutting line, and thus annealing conditions can be adjusted as appropriate depending on a fusing status and the like. In particular, in the case of forming the intensity distribution in which thermal energy decreases from the fusing execution portion to the fusing completed portion, the influence of the irradiation heat of the annealing laser beam is weakened from the fusing execution portion to the fusing completed portion on the preset cutting line, and hence a gentle temperature gradient in which a temperature gradually decreases is formed. As a result, the fused end surface to be annealed exhibits a satisfactory temperature distribution at the time of annealing.

In the above-mentioned method, it is preferred that the annealing laser beam be inclined so as to come closer to the glass sheet from a fusing uncompleted portion side toward the fusing completed portion side on the preset cutting line or from the fusing completed portion side toward the fusing uncompleted portion side on the preset cutting line.

According to this, the region irradiated with the annealing laser beam, which is projected on the glass sheet, is elongated from the fusing uncompleted portion side to the fusing completed portion side of the fused end surfaces of the glass sheet, and hence it is possible to satisfactorily anneal the glass sheet. At this time, in a case where a collimated beam is adopted as the annealing laser beam, an energy distribution of the projected region is point-symmetric with respect to a center of the projected region. Further, in a case where a focused beam is defocused for irradiation, it is possible to gradually decrease the intensity of thermal energy from the fusing execution portion to the fusing completed portion, or to gradually increase the intensity of thermal energy from the fusing completed portion to the fusing execution portion. Accordingly, in the former case where the focused beam is defocused for irradiation, it is possible to easily form a temperature gradient in which a temperature gradually decreases from the fusing execution portion to the fusing completed portion on the preset cutting line.

In this case, a case where an inclined focused beam is defocused for irradiation is additionally described. As illustrated in FIG. 1, cross-sections of a beam taken along a horizontal direction on upper and lower sides of a focus point FP exhibit energy distributions in which energy decreases from one side of an elongated irradiation region to the other side thereof, and the upper cross-section (cross-section 1) and the lower cross-section (cross-section 2) have opposite distributional gradients. Specifically, the upper cross-section exhibits a distribution in which energy gradually decreases from a front side of the upper cross-section in the horizontal direction to a rear side thereof in the horizontal direction, and the lower cross-section exhibits a distribution in which energy gradually decreases from a rear side of the lower cross-section in the horizontal direction to a front side thereof in the horizontal direction.

In the above-mentioned method, it is preferred that the annealing laser beam have an elliptical beam shape in cross-section orthogonal to an optical axis thereof.

According to this, the annealing laser beam can be radiated over a wide range of the glass sheet, and hence it is possible to efficiently anneal the fused end surface. Further, in the case where the annealing laser beam is inclined as described above, without increasing an inclination of the annealing laser beam, an overall length of the irradiation region is increased, and thus the intensity of thermal energy can exhibit a gentle intensity gradient.

In the above-mentioned method, the region irradiated with the annealing laser beam may be formed to overlap a region irradiated with the fusing laser beam so as to extend astride the region irradiated with the fusing laser beam. The term "overlap" described herein refers to a state in which the region irradiated with the annealing laser beam protrudes in the front and the rear of the region irradiated with the fusing laser beam (along a fusing propagating direction) while the region irradiated with the annealing laser beam and the region irradiated with the fusing laser beam overlap each other. That is, in a width direction orthogonal to the fusing propagating direction, a part of the region irradiated with the fusing laser beam may extend beyond or within the region irradiated with the annealing laser beam.

According to this, prior to irradiation of the fusing laser beam, the glass sheet can be preheated in a part of the region irradiated with the annealing laser beam. Accordingly, it is possible to prevent sharp temperature rise of the glass sheet at the time of fusing of the glass sheet with the fusing laser beam, and to reduce occurrence of a thermal residual strain.

In the above-mentioned method, the fusing laser beam and the annealing laser beam may be formed through splitting a laser beam emitted from the same light source.

According to this, the number of the light sources can be set to one, and hence it is possible to achieve space saving. In this case, it is preferred to adjust an output of the fusing laser beam and an output of the annealing laser beam to optimum values. Examples of a method of adjusting the outputs include the following: adjusting a transmittance (or a reflectance) of a half-silvered mirror or the like which is used to split a beam of light into the fusing laser beam and the annealing laser beam; and arranging, on an optical path, an optical component such as a neutral density (ND) filter which is used to reduce an intensity of light.

In the above-mentioned method, the fusing laser beam and the annealing laser beam may be formed emission from separate light sources.

According to this, the light source of the fusing laser beam and the light source of the annealing laser beam are independent of each other, and hence there is an advantage that the output of one of the laser beams can be easily adjusted without affecting the other of the laser beams.

According to the first invention devised to achieve the above-mentioned first object, there is provided a glass sheet cutting device for irradiating a laser beam from above along a preset cutting line of a glass sheet, and fusing and dividing the glass sheet using the preset cutting line as a boundary, the glass sheet cutting device comprising: a first laser irradiator for radiating a fusing laser beam for fusing the glass sheet; and a second laser irradiator for radiating an annealing laser beam for annealing fused end surfaces of the glass sheet, wherein the second laser irradiator radiates the annealing laser beam obliquely from above onto at least one of the fused end surfaces to be annealed through a gap that is formed between the fused end surfaces by the fusing.

This configuration can provide the same operations and effects as those of the above-mentioned corresponding method invention. Note that, the first laser irradiator and the second laser irradiator may be formed of separate components, or the first laser irradiator may double as the second laser irradiator.

<Second Invention>

According to a second invention devised to achieve the above-mentioned second object, there is provided a glass sheet cutting method, comprising: radiating a fusing laser beam and an annealing laser beam along a preset cutting line of a glass sheet; and fusing and dividing the glass sheet using the preset cutting line as a boundary, wherein a region irradiated with the annealing laser beam is set larger in dimension in a fusing propagating direction along the preset cutting line than a region irradiated with the fusing laser beam, and wherein the region irradiated with the annealing laser beam overlaps the region irradiated with the fusing laser beam so as to extend astride the region irradiated with the fusing laser beam along the fusing propagating direction. Note that, the term "overlap" described herein refers to a state in which the region irradiated with the annealing laser beam protrudes in the front and the rear of the region irradiated with the fusing laser beam along the fusing propagating direction while the region irradiated with the annealing laser beam and the region irradiated with the fusing laser beam overlap each other. That is, in a width direction orthogonal to the fusing propagating direction, a part of the region irradiated with the fusing laser beam may extend beyond or within the region irradiated with the annealing laser beam. In the former case, for example, when fusing and dividing the glass sheet into a product portion (non-defective product) and a non-product portion (defective product), if the fusing laser beam extends to the non-product portion side and the annealing laser beam is radiated onto the product portion side, the effects of the present invention can be actually attained. In the latter case, the region irradiated with the annealing laser beam contains the whole region irradiated with the fusing laser beam.

According to this method, when the region irradiated with the annealing laser beam is heated, regions of the glass sheet, which extend along the fusing propagating direction in the front and the rear of the region irradiated with the fusing laser beam, are heated at a predetermined temperature equal to or lower than a fusing temperature. That is, in the region irradiated with the annealing laser beam, a region extending along the fusing propagating direction in the rear of the region irradiated with the fusing laser beam is subjected to annealing, whereas a region extending along the fusing propagating direction in the front of the region irradiated with the fusing laser beam is subjected to preheating. Accordingly, breakage due to sharp temperature rise or sharp temperature fall before or after fusing, i.e., breakage due to thermal shock, and occurrence of the thermal residual strain can be reduced as much as possible. Further, the region irradiated with the annealing laser beam, which functions as a region to be preheated and annealed, overlaps the region irradiated with the fusing laser beam, and hence the respective regions to be preheated, fused, and annealed are easily and reliably continuous with one another along the fusing propagating direction. Therefore, the series of heat treatments is continuously performed on the glass sheet, and hence it is possible to efficiently remove the thermal residual strain while suppressing a loss of supplied thermal energy. Note that, a balance between preheating and annealing can be easily adjusted through changing a position of the region irradiated with the fusing laser beam relative to a position of the region irradiated with the annealing laser beam.

In the above-mentioned method, it is preferred that the glass sheet be fused and divided into a product portion and a non-product portion, and that a larger part of the region irradiated with the annealing laser beam be formed on the product portion side than on the non-product portion side.

According to this, in a case where the glass sheet is fused and divided into the product portion and the non-product portion, a preheating process and an annealing process can be preferentially performed on the product portion side of the glass sheet, and hence it is possible to more reliably reduce the thermal residual strain in the product portion.

In the above-mentioned method, it is preferred that the region irradiated with the fusing laser beam overlap the region irradiated with the annealing laser beam on a front side in the fusing propagating direction with respect to a center position of the region irradiated with the annealing laser beam in the fusing propagating direction.

According to this, in the region irradiated with the annealing laser beam, a region of the glass sheet to be annealed is larger in length in the fusing propagating direction than a region of the glass sheet to be preheated. The thermal residual strain occurs due to rapid cooling performed after fusing.

Thus, the region to be annealed is set large as described above, which is preferred in removing the thermal residual strain.

In the above-mentioned method, the region irradiated with the annealing laser beam may have an elongated shape along the fusing propagating direction.

The thermal residual strain occurs concentratedly in a vicinity of a fused portion of the glass sheet. When the region irradiated with the annealing laser beam is formed into an elongated shape along the fusing propagating direction (for example, elliptical shape), the annealing laser beam can be radiated selectively onto the fused end portion. Therefore, a waste of supplied thermal energy can be reduced as much as possible.

In the above-mentioned method, it is preferred that the annealing laser beam be obliquely radiated onto a surface of the glass sheet.

According to this, when the annealing laser beam is projected on the surface of the glass sheet, the region irradiated with the annealing laser beam is elongated, and hence the region irradiated with the annealing laser beam can be easily formed into an elongated shape.

In the above-mentioned method, it is preferred that the fusing laser beam and the annealing laser beam have different wavelengths.

A laser beam is coherent light, and hence has high coherence. In the present invention, when interference fringes are formed in a part in which the region irradiated with the fusing laser beam and the region irradiated with the annealing laser beam overlap each other, a distribution of energy applied to the glass sheet is complicated. As a result, it is difficult to satisfactorily control the respective fusing process and annealing process. Therefore, in the above-mentioned method, the fusing laser beam and the annealing laser beam have different wavelengths. This prevents formation of temporally-steady interference fringes in the region in which both the laser beams overlap each other. Accordingly, in consideration of time average in the above-mentioned region in which the laser beams overlap each other, it is possible to reduce an influence of the interference fringes, and it is easy to satisfactorily control the distribution of energy applied to the glass sheet.

In the above-mentioned method, it is preferred that the fusing laser beam and the annealing laser beam be laser beams oscillated by different oscillators.

According to this, it is possible to easily and stably set a difference between a wavelength of the fusing laser beam and a wavelength of the annealing laser beam. That is, in a case of using different oscillators, for example, even oscillators for oscillating the same laser media can easily oscillate laser beams having different wavelengths. Accordingly, it is possible to prevent formation of temporally-steady interference fringes in the region in which the fusing laser beam and the annealing laser beam overlap each other.

Note that, according to the above-mentioned method, even in a case where a laser beam oscillated by the same oscillator is split into and used as the fusing laser beam and the annealing laser beam, in consideration of a coherence length between both the laser beams, formation of interference fringes can be prevented through adjustment of an optical path difference between the fusing laser beam and the annealing laser beam.

Advantageous Effects of Invention

According to the above-mentioned first invention, it is possible to reliably anneal the whole fused end surface of the glass sheet, and hence a situation that deformation such as warpage occurs in the glass sheet can be reduced as much as possible.

Further, according to the above-mentioned second invention, the respective irradiation regions to be preheated, fused, and annealed are continuous with one another, and hence it is possible to reduce as much as possible a loss of thermal energy which is applied at the time of preheating and annealing performed before and after fusing. Therefore, it is possible to reliably reduce a percentage of a risk that the glass sheet breaks due to thermal shock or the thermal residual strain occurs in the glass sheet.

DESCRIPTION OF EMBODIMENTS

In the following, embodiments of a first invention and a second invention are described with reference to the drawings, respectively. Note that, in the following, a glass sheet refers to a glass substrate for flat panel displays, which has a thickness of 500 μm or less. As a matter of course, the glass sheet to be cut is not limited thereto, and may be, for example, glass substrates utilized in various fields, such as a glass substrate for solar cells, OLED illumination devices, touch panels, and digital signages, and laminated bodies formed of such glass substrates and organic resins. Note that, a thickness of the glass sheet is preferably 300 μm or less, and particularly preferably 200 μm or less.

Embodiment of First Invention

Figure 2A:
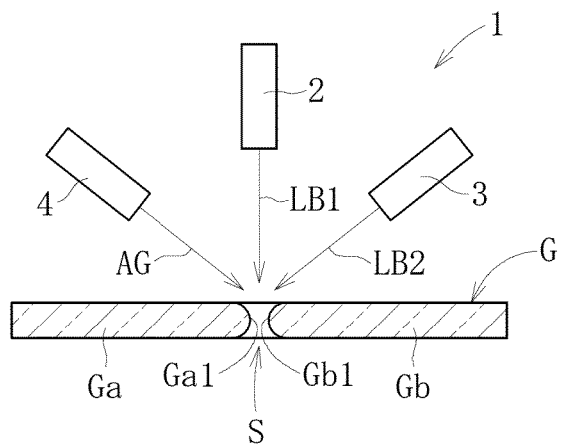
FIG. 2A is a cross-sectional view illustrating a glass sheet cutting device according to an embodiment of the first invention.
Figure 2B:
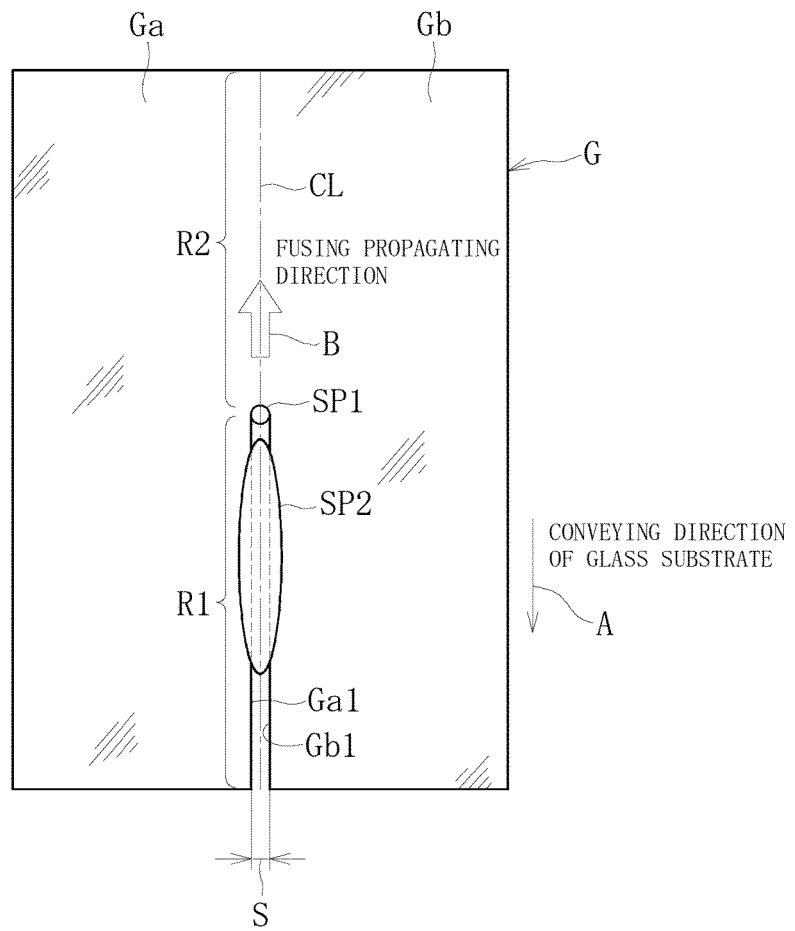
FIG. 2B is a plan view illustrating a region onto which a laser beam is radiated by the glass sheet cutting device according to the embodiment of the present invention illustrated in FIG. 1.

As illustrated in FIGS. 2A and 2B, a glass sheet cutting device 1 according to the embodiment of the first invention fuses and divides a glass substrate G in a horizontal posture into a product portion Ga and a non-product portion Gb using a preset cutting line CL as a boundary. The glass sheet cutting device 1 comprises a first laser irradiator 2, a second laser irradiator 3, and a gas jet nozzle 4.

The first laser irradiator 2 substantially vertically radiates a fusing laser beam LB1 directly from above the preset cutting line CL of the glass substrate G. With the fusing laser beam LB1, a first irradiation region SP1 as a fusing execution portion is formed on a part of the preset cutting line CL of the glass substrate G. In this embodiment, the first irradiation region SP1 is scanned along the preset cutting line CL in such a manner that the glass substrate G is moved in a conveying direction (arrow "A" direction of FIG. 2B) by conveying means (not shown) (for example, conveyor belt for attracting and retaining the glass substrate G). In this manner, the glass substrate G is continuously fused and divided. That is, an arrow "B" direction of FIG. 2B, which is opposite to the arrow "A" direction, corresponds to a fusing propagating direction. At this time, a fusing gap S is formed between a fused end surface Ga1 on the product portion Ga side and a fused end surface Gb1 on the non-product portion Gb side. Note that, the present invention is not limited to the case where only the glass substrate G is moved in the above-mentioned manner. Fusing of the glass substrate G can be performed through relative movement between the glass substrate G and a processing unit comprising the first laser irradiator 2, the second laser irradiator 3, and the gas jet nozzle 4. For example, the processing unit may be moved under a state in which the glass substrate G is stationary.

The second laser irradiator 3 obliquely radiates an annealing laser beam LB2 onto the fused end surface Ga1 on the product portion Ga side from above the non-product portion Gb side through the fusing gap S which is formed between the fused end surfaces Ga1, Gb1 of the glass substrate G by the fusing laser beam LB1. With the annealing laser beam LB2, a second irradiation region SP2 as an annealing performing portion is formed on a part of the preset cutting line CL of the glass substrate G. The second irradiation region SP2 has an elongated shape (elliptical shape in the illustrated example) along the preset cutting line CL, and is formed in a fusing completed portion R1 on the preset cutting line CL at a distance from the first irradiation region SP1. In this embodiment, the glass substrate G is moved in the above-mentioned manner, and thus the second irradiation region SP2 is scanned along the preset cutting line CL. In this manner, the fused end surface Ga1 on the product portion Ga side is continuously annealed.

Figure 3A:
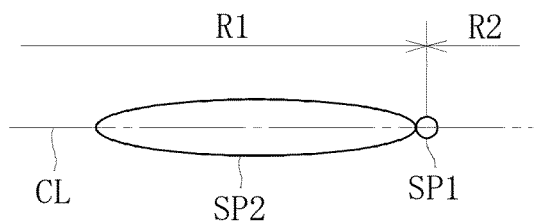
FIG. 3A is a plan view illustrating a modification of the region onto which the laser beam is radiated by the glass sheet cutting device according to the embodiment of the first invention.
Figure 3B:
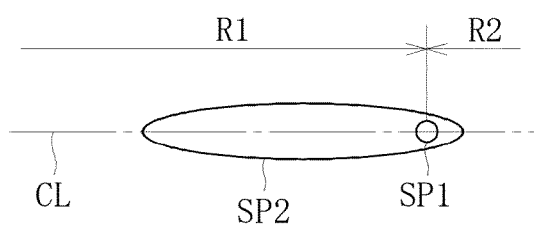
FIG. 3B is a plan view illustrating another modification of the region onto which the laser beam is radiated by the glass sheet cutting device according to the embodiment of the first invention.

Note that, as illustrated in FIG. 3A, the second irradiation region SP2 may abut on the first irradiation region SP1. Further, as illustrated in FIG. 3B, the second irradiation region SP2 may be formed to overlap the first irradiation region SP1 so as to extend astride the first irradiation region SP1 along the conveying direction. In the latter case, a part of the second irradiation region SP2 is formed in a fusing uncompleted portion R2 of the glass substrate G, and hence the glass substrate G is preheated immediately before being fused.

The gas jet nozzle 4 jets an assist gas AG onto the first irradiation region SP1 from above in order to blow off a molten foreign matter generated in the first irradiation region SP1. Specifically, the gas jet nozzle 4 is arranged at a position above the product portion Ga side of the glass substrate G, and the assist gas AG is obliquely jetted onto the first irradiation region SP1 from the position above the product portion Ga side. In this manner, the assist gas AG blows off the molten foreign matter toward the non-product portion Gb, to thereby prevent such a situation that the molten foreign matter adheres to the fused end surface Ga1 of the product portion Ga to cause a defect in shape. The term "molten foreign matter" herein means a foreign matter such as dross generated at the time of fusing of the glass substrate G, and includes both a molten matter and a solid matter.

Examples of the assist gas AG comprise individual ones or mixtures of gases of oxygen (or air), water vapor, carbon dioxide, nitrogen, argon, and the like. Further, the assist gas AG may be jetted as hot blast.

Note that, the arrangement position of the gas jet nozzle 4 in a space above the glass substrate G is not particularly limited. For example, the gas jet nozzle 4 may be arranged directly above the preset cutting line CL so as to substantially vertically jet the assist gas AG onto the glass substrate G along with the fusing laser beam LB1. Further, the gas jet nozzle 4 may be arranged in a space below the glass substrate G so as to blow off the molten foreign matter from below the glass substrate G. The assist gas AG is used to efficiently perform fusing, but may be omitted as appropriate.

Figure 4:
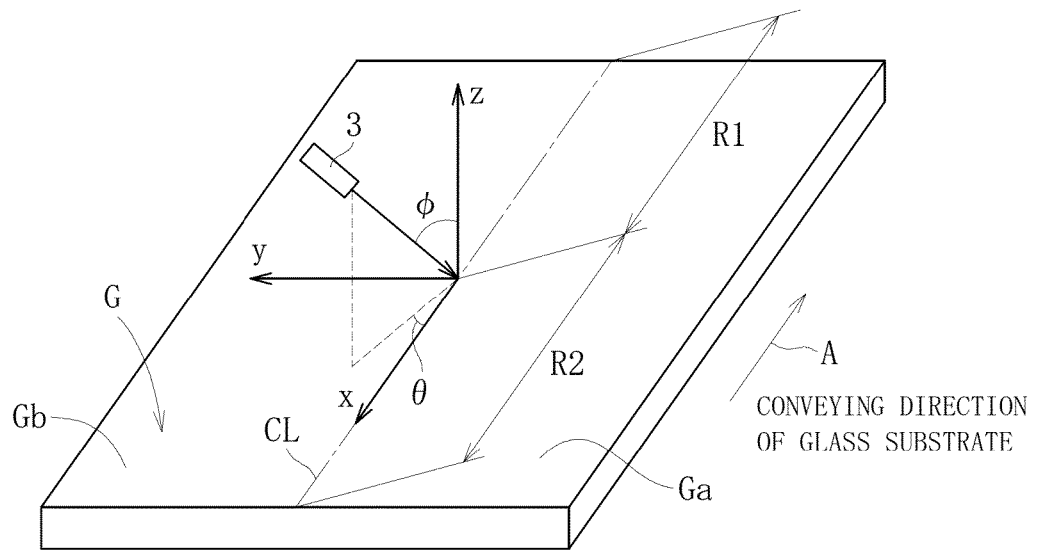
FIG. 4 is a perspective view illustrating a state in which an annealing laser beam is radiated by the glass sheet cutting device according to the embodiment of the first invention.

In this embodiment, as illustrated in FIG. 4, the second laser irradiator 3 is arranged at a position above the fusing uncompleted portion R2 on the non-product portion Gb side. The annealing laser beam LB2 to be emitted from the second laser irradiator 3 is inclined so as to come closer to the glass substrate G as irradiation of the annealing laser beam is shifted from the fusing uncompleted portion R2 side to the fusing completed portion R1 side. Note that, the annealing laser beam LB2 may be inclined so as to come closer to the glass substrate G as the irradiation is shifted from the fusing completed portion R1 side to the fusing uncompleted portion R2 side.

Figure 5:
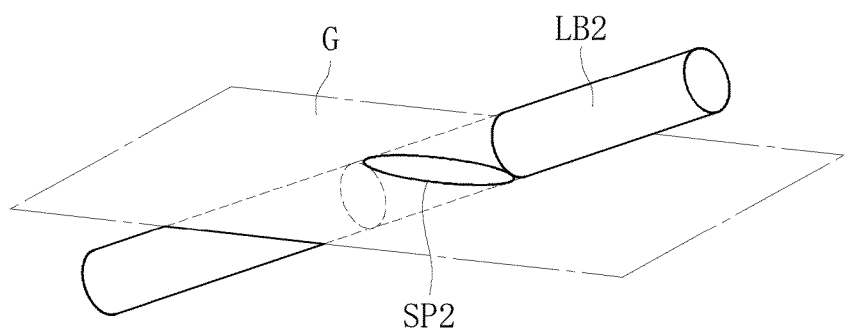
FIG. 5 is a perspective view illustrating a state in which the annealing laser beam is radiated by the glass sheet cutting device according to the embodiment of the first invention.

That is, the annealing laser beam LB2 has an azimuthal angle $\theta 0$ and a polar angle $\phi$ as illustrated in FIG. 4. Accordingly, as illustrated in FIG. 5, the second irradiation region SP2 projected on the glass substrate G is elongated from the first irradiation region SP1 as the fusing execution portion to the fusing completed portion R1, and thus has an elliptical shape. In FIG. 2B, a direction of a major axis of the elliptical shape is parallel to the preset cutting line CL. The direction of the major axis of the elliptical shape varies depending on a magnitude of the azimuthal angle $\theta$, but has a component in the fusing propagating direction. Note that, under a condition of $\theta=\pi/2$, in order that the direction of the major axis extends along the preset cutting line CL, the annealing laser beam LB2, whose cross-section orthogonal to an optical axis is previously formed into an elliptical shape, may be radiated onto the fused end surface Ga1 on the product portion Ga side. As a method of previously forming the cross-section orthogonal to the optical axis of the laser beam into an elliptical shape, use of an optical component such as a cylindrical lens and use of a slit-like shading mask are exemplified.

Figure 1:
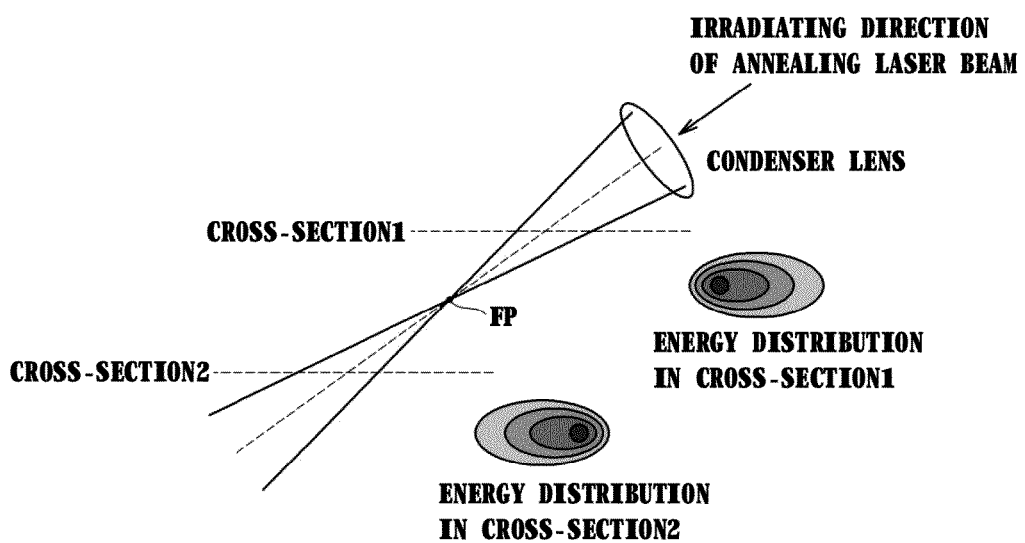
FIG. 1 is a view illustrating operations achieved by a glass sheet cutting method according to a first invention.
Figure 6:
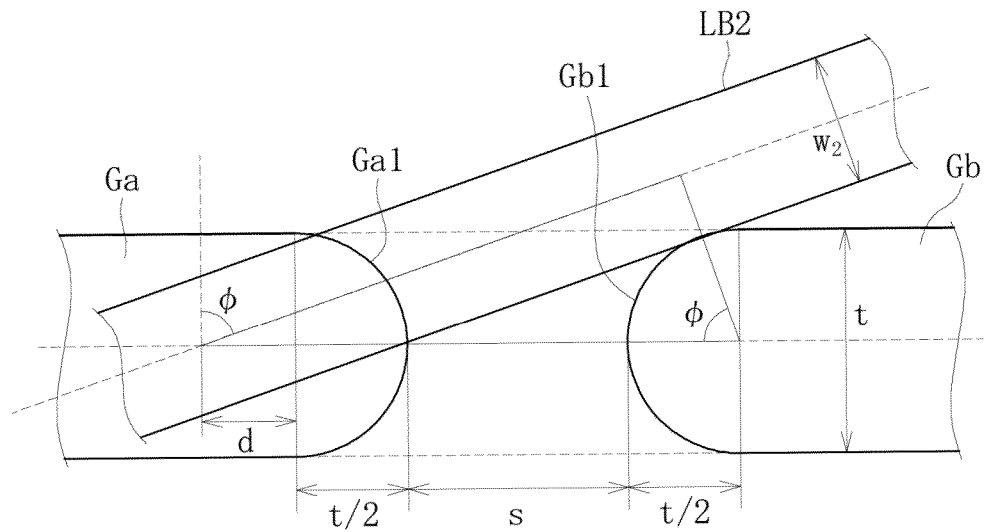
FIG. 6 is a conceptual diagram illustrating an irradiation state in a case where a collimated beam is used as the annealing laser beam radiated by the glass sheet cutting device according to the embodiment of the first invention.
Figure 7:
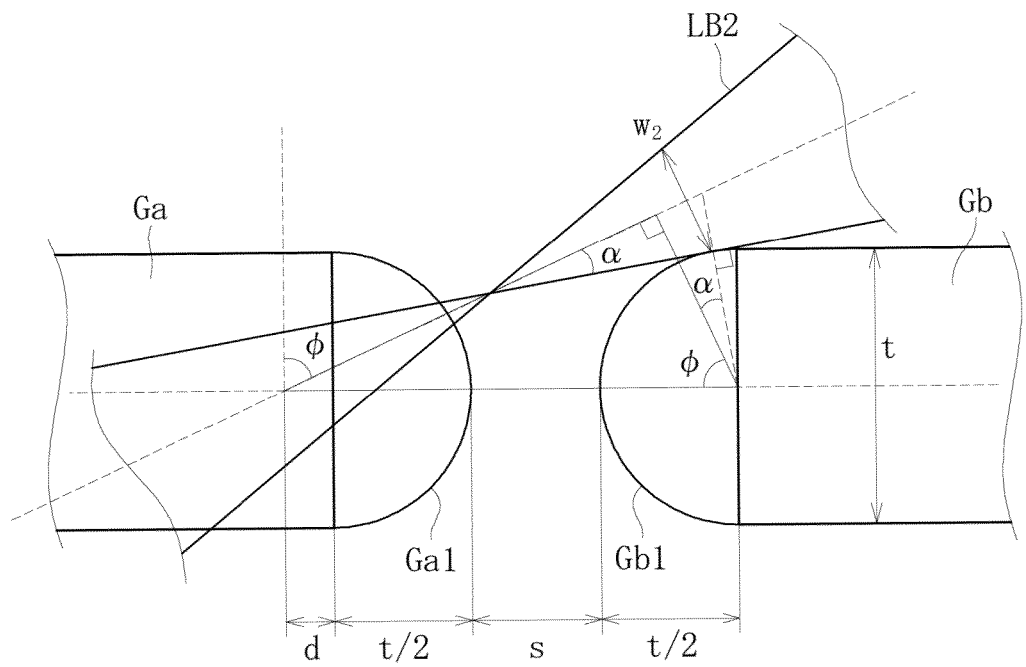
FIG. 7 is a conceptual diagram illustrating an irradiation state in a case where a focused beam is used as the annealing laser beam radiated by the glass sheet cutting device according to the embodiment of the first invention, and the focused beam is defocused for irradiation.

In this case, it is preferred that the azimuthal angle $\theta$ and the polar angle $\phi$ of the annealing laser beam LB2 be in the following ranges. That is, it is preferred that the azimuthal angle $\theta$ be in a range of $0<\theta<\pi/2$ or a range of $\pi/2<\theta<\pi$. In those ranges, the azimuthal angle $\theta$ has a component in a direction along the preset cutting line CL, and hence an intensity of thermal energy of the annealing laser beam LB2 in the second irradiation region SP2 gently changes from the first irradiation region SP1 side to the fusing completed portion R1 side. Therefore, there is formed an intensity gradient in which the intensity of thermal energy gently changes from the first irradiation region SP1 on the preset cutting line CL to the fusing completed portion R1 side. Note that, as illustrated in FIG. 6, in a case where a collimated beam is adopted as the annealing laser beam LB2, the same effects of irradiation are obtained in both the following ranges of the azimuthal angle $\theta$: $0<\theta<\pi/2$ and $\pi/2<\theta<\pi$. However, as illustrated in FIG. 7, in a case where a focused beam is adopted and is defocused for irradiation, there is an appropriate range of the azimuthal angle $\theta$. That is, in a case where the focused beam is defocused for irradiation onto the glass substrate G at a position below a focus point (see a cross-section 2 illustrated in FIG. 1), the range of $0<\theta<\pi/2$ is appropriate. In contrast, in a case where the focused beam is defocused for irradiation onto the glass substrate G at a position above the focus point (see a cross-section 1 illustrated in FIG. 1), the range of $\pi/2<\theta<\pi$ is appropriate.

On the other hand, as illustrated in FIG. 6, in a case where the collimated beam is adopted as the annealing laser beam LB2, it is preferred that the polar angle $\phi$ satisfy a range of $0<\phi<\cos^{-1}[(t+w_2)/\{2(s+t+d)\}]$, where $w_2$ represents a beam diameter of the annealing laser beam LB2, t represents a thickness of the glass substrate G, and d represents an adjustment amount of an irradiation position. Further, as illustrated in FIG. 7, in a case where the focused beam is adopted as the annealing laser beam LB2 and is defocused for irradiation, it is preferred that the polar angle $\phi$ satisfy a range of $0<\phi<\cos^{-1}[(t\cos\alpha+w_2)/\{2(s+t+d)\}]$, where $w_2$ represents the beam diameter of the annealing laser beam LB2 at a point of contact between the non-product portion Gb and the annealing laser beam LB2, $\alpha$ represents a converging angle, t represents the thickness of the glass substrate G, and d represents the adjustment amount of the irradiation position. In other words, it is preferred that the polar angle $\phi$ be set in such an angle range that the polar angle $\phi$ does not interfere with a vicinity of the fused end surface Gb1 of the non-product portion Gb that is close to and opposed to the fused end surface Ga1 of the product portion Ga. It is preferred that an irradiation position of the annealing laser beam LB2 be adjusted in accordance with a position of a tensile stress generated in a vicinity of the fused end surface Ga1 of the product portion Ga before annealing. The adjustment amount d of the irradiation position is adjusted, for example, in a range of $-0.5t \leq d \leq 2.5t$.

Note that, when the annealing laser beam LB2 is formed to have an elliptical cross-section orthogonal to the optical axis, without increasing an inclination angle (polar angle $\phi$), it is possible to form the second irradiation region SP2 that has a large overall length and a gentle gradient of an energy distribution.

Next, brief description is made of operations of the glass sheet cutting device 1 according to this embodiment configured as described above.

First, as illustrated in FIGS. 2A and 2B, while the glass substrate G is conveyed, the fusing laser beam LB1 is radiated from the first laser irradiator 2 onto the glass substrate G. In this manner, the glass substrate G is fused. At this time, the assist gas AG is jetted from the gas jet nozzle 4 onto the first irradiation region SP1 irradiated by the fusing laser beam LB1, to thereby blow off the molten foreign matter from the first irradiation region SP1.

At the same time, the annealing laser beam LB2 is radiated from the second laser irradiator 3 onto the glass substrate G. The annealing laser beam LB2 is obliquely radiated from above onto the fused end surface Ga1 on the product portion Ga side through the fusing gap S which is formed between the fused end surfaces Ga1 and Gb1 through irradiation of the fusing laser beam LB1. In this manner, the fused end surface Ga1 is annealed.

Thus, unlike a case where the annealing laser beam LB2 is vertically radiated onto an upper surface of the glass substrate G, an influence of irradiation heat of the annealing laser beam LB2 does not extremely act mostly on the upper surface of the glass substrate G. In addition, the annealing laser beam LB2 is directly radiated onto a part or whole of the fused end surface Ga1, and hence the irradiation heat is easily transferred to the whole fused end surface Ga1. Therefore, even when the glass substrate is a thin sheet having a thickness of 500 μm or less, a residual strain is effectively removed, and hence it is possible to avoid a problem in that deformation such as warpage occurs.

In this case, fusing of the glass substrate G is completed in such a manner that the upper surface side of the glass substrate G starts melting due to the fusing laser beam LB1, and a cut groove formed by the melting extends downward through the glass substrate G. Accordingly, a part of the fused end surface Ga1 closer to the upper surface is more strongly influenced by the irradiation heat supplied at the time of fusing, and hence it is conceivable that the fused end surface Ga1 has a relatively large thermal residual strain on the upper surface side thereof. Therefore, it is preferred to perform an annealing process while supplying more heat to the upper surface side of the fused end surface Ga1 in order to remove the residual strain of the fused end surface Ga1. Accordingly, as illustrated in FIGS. 6 and 7, it is preferred to directly radiate the annealing laser beam LB2 onto an upper portion (for example, upper half region) of the fused end surface Ga1.

Note that, the first invention is not limited to the above-mentioned embodiment, and various modifications can be made thereto.

Figure 8:
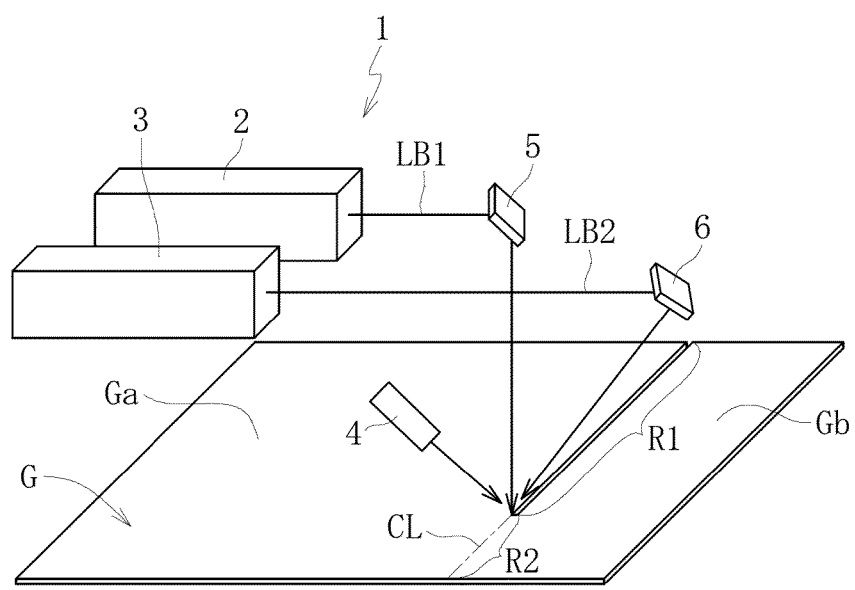
FIG. 8 is a perspective view illustrating a modification of the state in which the laser beam is radiated by the glass sheet cutting device according to the embodiment of the first invention.

In the above-mentioned embodiment, description is made of the case where the first laser irradiator 2 is arranged directly above the preset cutting line CL of the glass substrate G, and the second laser irradiator 3 is arranged above the non-product portion Gb of the glass substrate G. However, modes of arrangement of the first laser irradiator 2 and the second laser irradiator 3 are not limited thereto. For example, as illustrated in FIG. 8, the first laser irradiator 2 and the second laser irradiator 3 may be arranged at positions above the product portion Ga, and the fusing laser beam LB1 and the annealing laser beam LB2 may be guided by optical components such as mirrors 5, 6.

Figure 9:
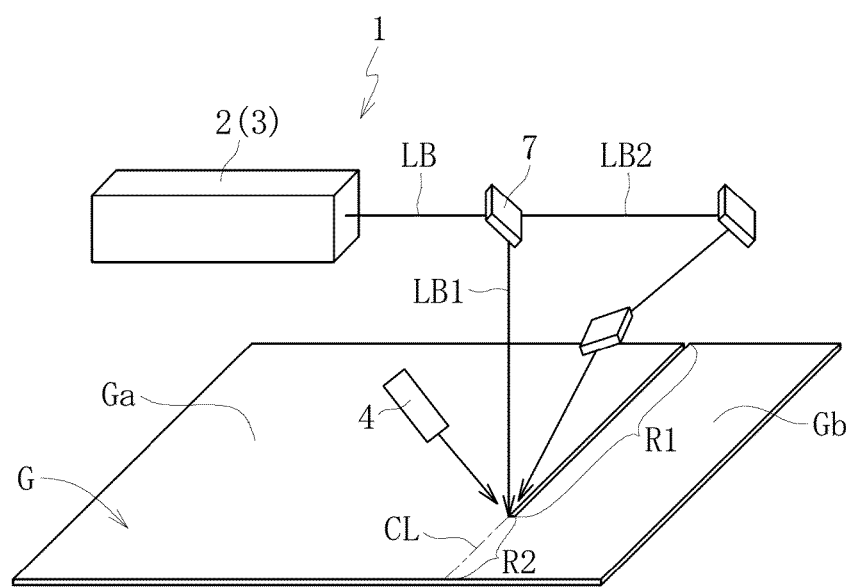
FIG. 9 is a perspective view illustrating another modification of the state in which the laser beam is radiated by the glass sheet cutting device according to the embodiment of the first invention.

Further, in the above-mentioned embodiment, the first laser irradiator 2 and the second laser irradiator 3 are formed of separate light sources. However, as illustrated in FIG. 9, the first laser irradiator 2 may double as the second laser irradiator 3. That is, a laser beam LB emitted from the first laser irradiator 2 may be split into the fusing laser beam LB1 and the annealing laser beam LB2 by an optical component such as a half-silvered mirror 7. In this case, the annealing laser beam LB2 may be radiated onto the glass substrate G after energy of the annealing laser beam LB2 is adjusted as appropriate through adjustment of a transmittance (or a reflectance) of the half-silvered mirror or the like, or through reduction of an intensity of light on its optical path with use of a neutral density (ND) filter or the like. Further, in consideration of a coherence length between the fusing laser beam LB1 and the annealing laser beam LB2, formation of interference fringes may be prevented through adjustment of an optical path difference between both the laser beams.

Figure 10:
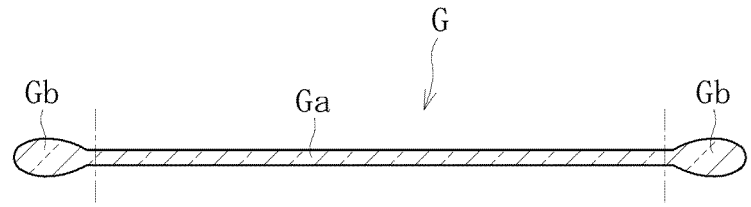
FIG. 10 is a cross-sectional view illustrating a modification of a glass substrate that is to be cut by the glass sheet cutting device according to the embodiment of the first invention.

Further, when the glass substrate G is formed by an overflow downdraw method or the like, as illustrated in FIG. 10, a thickness of both widthwise end portions of the glass substrate G is relatively larger than a thickness of a widthwise central portion of the glass substrate G. The widthwise central portion is produced as the product portion Ga, and both the widthwise end portions are each produced as the non-product portion (referred to as selvage portions) Gb. The cutting method and the cutting device according to the first invention may be utilized for removing such selvage portions of the glass substrate G.

Further, in the above-mentioned embodiment, description is made of a case where the glass substrate G is fused and divided into the product portion Ga and the non-product portion Gb. However, the cutting method and the cutting device according to the first invention are applicable to a case where both of fused and divided portions of the glass substrate G are utilized as the product portions.

Example 1

As an example of the first invention, samples formed of non-alkali glass and samples formed of soda-lime glass were prepared, and each sample was fused. Each sample was confirmed regarding the following items: (1) whether a residual strain was present or absent in a fused end surface; (2) whether each sample broke or not after undergoing a flaw test for the fused end surface; and (3) whether warpage was present or absent in each fused sample. Note that, as a fusing laser beam and an annealing laser beam, a $CO_2$ laser beam having a wavelength of about 10.6 μm was used. Further, a region (SP1) irradiated with the fusing laser beam and a region (SP2) irradiated with the annealing laser beam had forms illustrated in FIG. 2B. The details of tests regarding the above-mentioned items (1) to (3) are as follows.

(1) Residual Strain

Whether the residual strain was present or absent in the fused end surface was confirmed through observation of the fused end surface of each sample using the Senarmont method or the sensitive color method as optical strain measurement.

(2) Flaw Test

As the flaw test for the fused end surface, it was confirmed whether each sample broke by itself or not after the fused end surface of each sample was flawed by sandpaper having a grid size of #1,000 and then each sample was left for 1,000 hours.

(3) Warpage

Each fused sample was placed on a surface plate, and whether warpage was present or absent in each fused sample was confirmed. Here, warpage was confirmed in a case where each sample was placed with a back surface side facing downward and in a case where each sample was placed with the back surface side facing upward. When a peripheral edge portion of each sample was separated by 0.3 mm from the surface plate in each case, it was evaluated that warpage was "present".

Results of the above-mentioned comparative tests are shown in Table 1. Note that, in Table 1, θ and φ correspond to symbols illustrated in FIG. 4, and $w_2$, s, and d correspond to symbols illustrated in FIGS. 6 and 7. Further, an energy intensity [W] of a laser beam in Table 1 is represented as an actual value on a surface of a glass substrate.

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Type of glass | Non-alkali glass | Non-alkali glass | Non-alkali glass | Non-alkali glass | Non-alkali glass | Soda-lime glass | Non-alkali glass | Soda-lime glass |
| Thickness | 0.1 mm | 0.1 mm | 0.1 mm | 0.3 mm | 0.3 mm | 0.5 mm | 0.1 mm | 0.5 mm |
| Fusing laser beam | 10 W | 10 W | 10 W | 12 W | 12 W | 20 W | 10 W | 20 W |
| Annealing laser beam | 12 W Collimated beam | 12 W Collimated beam | 12 W Focused beam | 15 W Collimated beam | 15 W Focused beam | 24 W Focused beam | 10 W Focused beam | 20 W Focused beam |
| $W_2$ | 0.3 mm | 0.3 mm | 0.5 mm | 0.6 mm | 0.7 mm | 1.0 mm |  |  |
| Converging angle α |  |  | 5° |  | 5° | 5° | 5° | 5° |
| s | 0.1 mm | 0.1 mm | 0.1 mm | 0.3 mm | 0.3 mm | 0.5 mm | 0.1 mm | 0.7 mm |
| d | 0.05 mm | 0.1 mm | 0.15 mm | 0.3 mm | 0.45 mm | 0.5 mm |  |  |
| $W_2$ shape | Circle | Ellipse | Circle | Circle | Circle | Circle | Circle | Circle |
| Shape of end surface | Substantially semicircle | Substantially semicircle | Substantially semicircle | Substantially semicircle | Substantially semicircle | Substantially semicircle | Substantially semicircle | Substantially semicircle |
| θ | 5° | 90° | 35° | 35° | 145° | 35° | Vertical incidence | Vertical incidence |
| φ | 35 | 45 | 30 | 55 | 60 | 55 |  |  |
| φ upper limit | 37 | 48 | 31 | 60 | 62 | 60 |  |  |
| Residual strain | Absent | Absent | Absent | Absent | Absent | Absent | Present | Present |
| Flaw test | No breakage | No breakage | No breakage | No breakage | No breakage | No breakage | Self-breakage | Self-breakage |
| Warpage | Absent | Absent | Absent | Absent | Absent | Absent | Present | Present |

With reference to Table 1 above, in Comparative Examples 1 and 2 in which the annealing laser beam vertically entered the glass substrate, it can be confirmed that a problem arose regarding each of the above-mentioned items: residual strain; flaw test; and warpage. In contrast, in Examples 1 to 6 in which the annealing laser beam obliquely entered the glass substrate, it can be understood that satisfactory results were obtained regarding all of the above-mentioned items: residual strain; flaw test; and warpage.

Embodiment of Second Invention

Similarly to the glass sheet cutting device according to the embodiment of the first invention, a glass sheet cutting device according to an embodiment of a second invention comprises a fusing laser irradiator, an annealing laser irradiator, and a gas jet nozzle (see FIG. 2A). Those components are the same as those of the glass sheet cutting device according to the embodiment of the first invention, and hence detailed description thereof is omitted. In the following, a difference in cutting method is mainly described.

Figure 11:
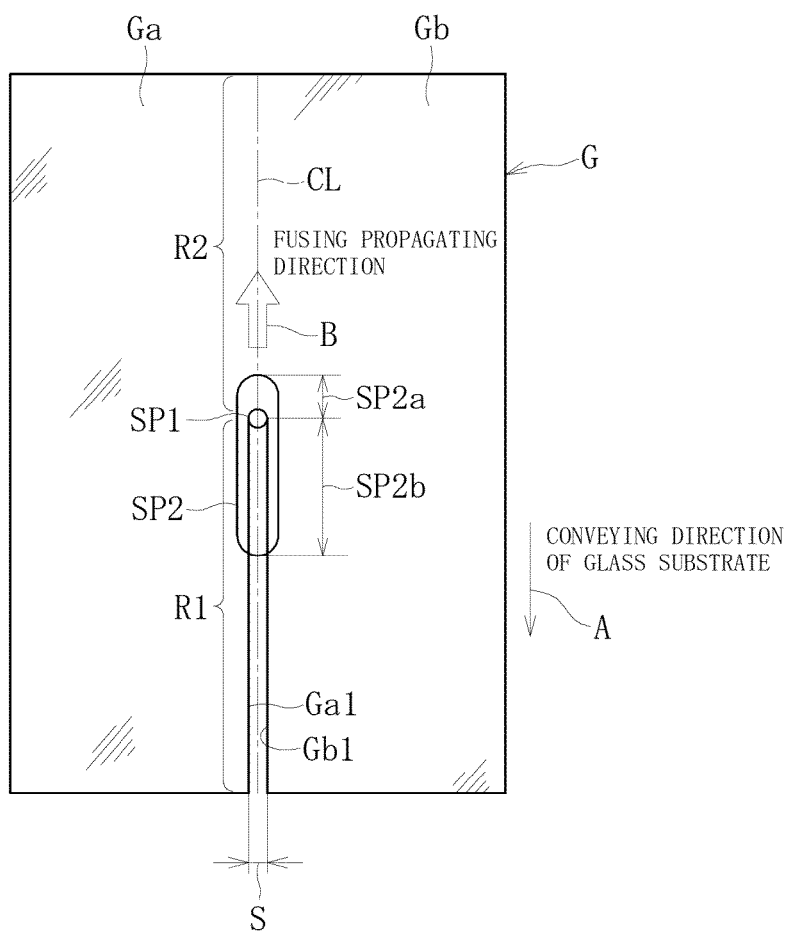
FIG. 11 is a plan view illustrating a region onto which a laser beam is radiated by a glass sheet cutting device according to an embodiment of a second invention.

As illustrated in FIG. 11, in a case where the glass sheet is cut by the glass sheet cutting device according to the embodiment of the second invention, the second irradiation region SP2 formed by the annealing laser beam overlaps the first irradiation region SP1 formed by the fusing laser beam so as to extend astride the first irradiation region SP1 along the fusing propagating direction (arrow "B" direction of FIG. 11). That is, under a state in which the first irradiation region SP1 and the second irradiation region SP2 overlap each other, the second irradiation region SP2 protrudes in the front and the rear of the first irradiation region SP1 along the fusing propagating direction. Accordingly, when the glass substrate G is heated in the second irradiation region SP2, in regions extending in the front and the rear of the first irradiation region SP1 along the fusing propagating direction, the glass substrate G is heated at a temperature (for example, 100 to 1,000 C.°) lower than a fusing temperature (for example, 1,300 to)3,000 C.°). That is, the glass substrate G is preheated in a region SP2$a$ of the second irradiation region SP2 extending in the front of the first irradiation region SP1 along the fusing propagating direction, and the glass substrate G is annealed in a region SP2$b$ of the second irradiation region SP2 extending in the rear of the first irradiation region SP1 along the fusing propagating direction. The second irradiation region SP2 is scanned along the preset cutting line CL in such a manner that the glass substrate G is moved in the conveying direction (arrow "A" direction of FIG. 11). In this manner, preheating and annealing are continuously performed on the glass substrate G before and after fusing.

Thus, breakage due to sharp temperature rise or sharp temperature fall before or after fusing, i.e., breakage due to thermal shock, and occurrence of the thermal residual strain can be reduced as much as possible. In particular, in a case where the glass substrate has a thickness of 500 μm or less, when the respective regions SP2$a$, SP1, and SP2$b$ to be preheated, fused, and annealed are spaced apart from one another, temperature rise and temperature fall are sharp. Further, the second irradiation region SP2, which functions as a region to be preheated and annealed, overlaps the first irradiation region SP1, and hence the respective regions SP2$a$, SP1, and SP2$b$ to be preheated, fused, and annealed are easily and reliably continuous with one another along the fusing propagating direction. Therefore, a series of heat treatments is continuously performed on the glass substrate G, and hence it is possible to avoid such a situation that thermal energy is extremely lost among the respective regions SP2$a$, SP1, and SP2$b$ subjected to the heat treatments. In other words, it is possible to remove the thermal residual strain while carrying out preheating and fusing efficiently using thermal energy supplied to the glass substrate G.

Figure 12A:
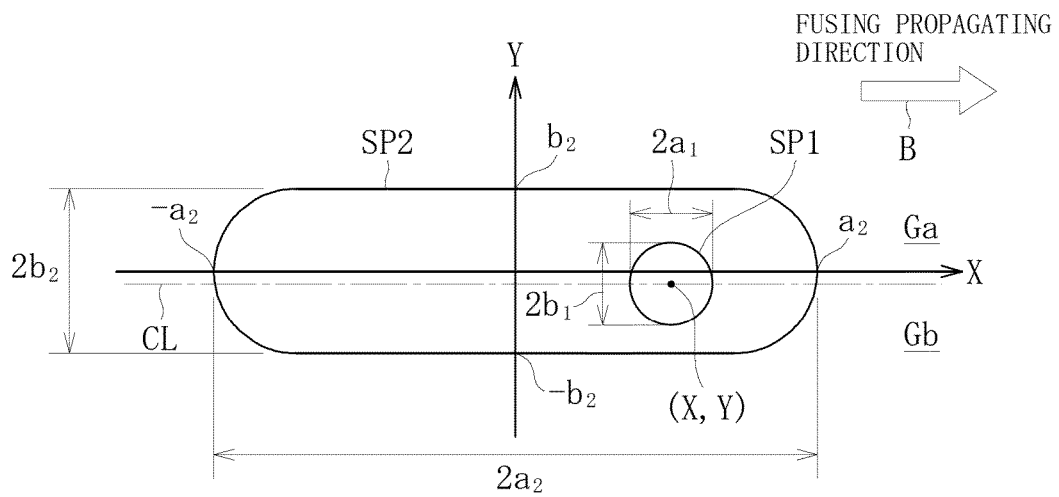
FIG. 12A is a view illustrating a positional relationship of regions onto which a fusing laser beam and the annealing laser beam are radiated by the glass sheet cutting device according to the embodiment of the second invention.

As illustrated in FIG. 12A, in a case where an X-axis is drawn as a line that passes through a center position of the second irradiation region SP2 in a direction orthogonal to the fusing propagating direction and extends in the fusing propagating direction, a Y-axis is drawn as a line that crosses the X-axis at a center position of the second irradiation region SP2 in the fusing propagating direction, $2a_2$ represents a dimension of the second irradiation region SP2 in the X-axis direction, $2b_2$ represents a dimension of the second irradiation region SP2 in the Y-axis direction, $2a_1$ represents a dimension of the first irradiation region SP1 in the X-axis direction, $2b_1$ represents a dimension of the first irradiation region SP1 in the Y-axis direction, and (x, y) represents center coordinates of the first irradiation region SP1, preferred relations between the first irradiation region SP1 and the second irradiation region SP2 are as follows.

That is, as relations in spot diameters of the first irradiation region SP1 and the second irradiation region SP2, $a_1 < a_2$ and $b_1 < b_2$ are satisfied, but it is preferred that the following be satisfied.

$$50a_1 \le a_2$$

$$30b_1 \le b_2 \tag{1}$$

Figure 12B:
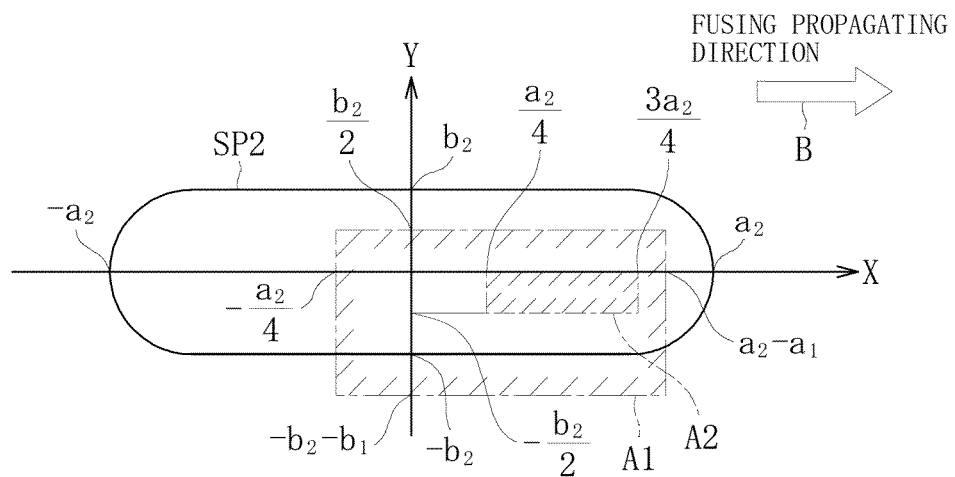
FIG. 12B is a view illustrating a preferred range of the positional relationship of the regions onto which the fusing laser beam and the annealing laser beam are radiated by the glass sheet cutting device according to the embodiment of the second invention.

Further, it is preferred that the center coordinates (x, y) of the first irradiation region SP1 satisfy the following relations (see a region A1 illustrated in FIG. 12B).

$$-a_2/4 \le x < a_2 - a_1$$

$$-b_2 - b_1 < y \le b_2/2 \tag{2}$$

It is more preferred that the center coordinates (x, y) of the first irradiation region SP1 satisfy the following relations (see a region A2 illustrated in FIG. 12B).

$$a_2/4 \le x \le 3a_2/4$$

$$-b_2/2 \le y \le 0 \tag{3}$$

When the above-mentioned relations (1) or relations (2) are satisfied, a size relationship and a positional relationship between the first irradiation region SP1 and the second irradiation region SP2 are optimized, and hence it is possible to reliably reduce occurrence of the thermal residual strain in the product portion Ga of the glass substrate G. Further, when the relations (3) are satisfied, a larger part of the second irradiation region SP2 is formed on the product portion Ga side than on the non-product portion Gb side, and the first irradiation region SP1 overlaps the second irradiation region SP2 on a front side with respect to the center position (position on the Y-axis) of the second irradiation region SP2 in the fusing propagating direction. With this configuration, the preheating process and the annealing process can be preferentially performed on the product portion Ga side of the glass substrate G, and hence it is possible to more reliably reduce the thermal residual strain in the product portion Ga. Further, in this case, in the irradiation region SP2, the region SP2$b$ to be annealed is larger in dimension in the fusing propagating direction than the region SP2$a$ to be preheated. The thermal residual strain occurs due to rapid cooling performed after fusing. Thus, the region to be annealed is set large as described above, and cooling speed is set low, which is preferred in removing the thermal residual strain.

Further, it is preferred that laser beams oscillated by different oscillators be used as the fusing laser beam and the annealing laser beam, to thereby set wavelengths of the laser beams different from each other. Thus, temporally-steady interference fringes are not formed by the fusing laser beam and the annealing laser beam, and hence it is easy to satisfactorily control a distribution of energy applied to the glass sheet.

Note that, the second invention is not limited to the above-mentioned embodiment, and various modifications can be made thereto.

For example, in the above-mentioned embodiment, description is made of the case where the glass substrate G is fused and divided into the product portion Ga and the non-product portion Gb. However, the present invention may be applied to a case where fused and divided pieces of the glass substrate G are both used as product portions.

Further, the modification described for the first invention is applicable in a similar way.

Example 2

As an example of the second invention, assuming that a glass substrate has a residual strain level of 10 after the glass substrate is fused in such a manner that the glass substrate is scanned with a fusing laser beam ($CO_2$ laser beam having a wavelength of about 10.6 μm, which is referred to as output 1 in Tables 2 to 4 below) at a relative movement speed of 10 mm/s, how much the residual strain level was lowered was examined. In a case where the residual strain level is 10, in the glass substrate, deformation such as warpage may occur or breakage may be caused at the time of handling and a processing step. It is preferred that the residual strain level be 3 or less. Further, along with the above-mentioned examination of the residual strain level, whether or not the glass substrate broke due to thermal shock at the time of fusing was examined. It is conceivable that breakage due to thermal shock may occur when the glass substrate is sharply heated at the time of fusing.

Specifically, it was evaluated how much the above-mentioned residual strain level and breakage level due to thermal shock were lowered through changing relative positions of regions irradiated with the fusing laser beam and the annealing laser beam ($CO_2$ laser beam having a wavelength of about 10.6 μm, which is referred to as output 2 in Tables 2 to 4 below) which were oscillated by different oscillators, or through changing a size of the region irradiated with the annealing laser beam. The results are shown in Tables 2 to 4. Note that, $a_1$, $b_1$, $a_2$, $b_2$, x, and y in Tables 2 to 4 below correspond to symbols illustrated in FIG. 12B. Further, the output 1 and the output 2 in Tables 2 to 4 below represent energy of the respective laser beams in a surface of the glass substrate.

TABLE 2

|  | No. 1 | No. 2 | No. 3 | No. 4 | No. 5 | No. 6 | No. 7 | No. 8 | No. 9 |
|---|---|---|---|---|---|---|---|---|---|
| Output 1 [W] | 10 | 10 | 10 | 10 | 10 | 10 | 10 | 10 | 10 |
| Output 2 [W] | — | 12 | 12 | 12 | 12 | 12 | 12 | 12 | 12 |
| $a_1$ [mm] | 0.03 | 0.03 | 0.03 | 0.03 | 0.03 | 0.03 | 0.03 | 0.03 | 0.03 |
| $b_1$ [mm] | 0.03 | 0.03 | 0.03 | 0.03 | 0.03 | 0.03 | 0.03 | 0.03 | 0.03 |
| $a_2$ [mm] | — | 2.0 | 0.6 | 0.8 | 1.0 | 1.3 | 1.5 | 1.7 | 1.5 |
| $b_2$ [mm] | — | 1.5 | 0.6 | 0.8 | 1.0 | 1.0 | 1.0 | 1.0 | 1.5 |
| x | — | 1.0 | 0.3 | 0.4 | 0.5 | 0.7 | 0.8 | 0.9 | 0.8 |
| y | — | −0.4 | −0.2 | −0.2 | −0.3 | −0.3 | −0.3 | −0.3 | −0.4 |
| $a_2/a_1$ | — | 67 | 20 | 27 | 33 | 43 | 50 | 57 | 50 |
| $b_2/b_1$ | — | 50 | 20 | 27 | 33 | 33 | 33 | 33 | 50 |
| Residual strain level | 10 | 1 | 6 | 5 | 3 | 2 | 1 | 1 | 1 |
| Crack due to thermal shock | Present | Absent | Nearly absent | Absent | Absent | Absent | Absent | Absent | Absent |

TABLE 3

|  | No. 10 | No. 11 | No. 12 | No. 13 | No. 14 | No. 15 | No. 16 | No. 17 | No. 18 | No. 19 | No. 20 |
|---|---|---|---|---|---|---|---|---|---|---|---|
| Output 1 [W] | 10 | 10 | 10 | 10 | 10 | 10 | 10 | 10 | 10 | 10 | 10 |
| Output 2 [W] | 12 | 12 | 12 | 12 | 12 | 12 | 12 | 12 | 12 | 12 | 12 |
| $a_1$ [mm] | 0.03 | 0.03 | 0.03 | 0.03 | 0.03 | 0.03 | 0.03 | 0.03 | 0.03 | 0.03 | 0.03 |
| $b_1$ [mm] | 0.03 | 0.03 | 0.03 | 0.03 | 0.03 | 0.03 | 0.03 | 0.03 | 0.03 | 0.03 | 0.03 |
| $a_2$ [mm] | 2.0 | 2.0 | 2.0 | 2.0 | 2.0 | 2.0 | 2.0 | 2.0 | 2.0 | 2.0 | 2.0 |
| $b_2$ [mm] | 1.5 | 1.5 | 1.5 | 1.5 | 1.5 | 1.5 | 1.5 | 1.5 | 1.5 | 1.5 | 1.5 |
| x | −2.0 | −1.0 | −0.4 | 0.0 | 0.4 | 0.6 | 1.0 | 1.5 | 1.6 | 1.8 | 2.0 |
| y | −0.4 | −0.4 | −0.4 | −0.4 | −0.4 | −0.4 | −0.4 | −0.4 | −0.4 | −0.4 | −0.4 |
| Residual strain level | 10 | 6 | 3 | 3 | 2 | 1 | 1 | 1 | 1 | 1 | 1 |
| Crack due to thermal shock | Absent | Absent | Absent | Absent | Absent | Absent | Absent | Absent | Nearly absent | Nearly absent | Present |

TABLE 4

|  | No. 21 | No. 22 | No. 23 | No. 24 | No. 25 | No. 26 | No. 27 | No. 28 | No. 29 | No. 30 | No. 31 |
|---|---|---|---|---|---|---|---|---|---|---|---|
| Output 1 [W] | 10 | 10 | 10 | 10 | 10 | 10 | 10 | 10 | 10 | 10 | 10 |
| Output 2 [W] | 12 | 12 | 12 | 12 | 12 | 12 | 12 | 12 | 12 | 12 | 12 |
| $a_1$ [mm] | 0.03 | 0.03 | 0.03 | 0.03 | 0.03 | 0.03 | 0.03 | 0.03 | 0.03 | 0.03 | 0.03 |
| $b_1$ [mm] | 0.03 | 0.03 | 0.03 | 0.03 | 0.03 | 0.03 | 0.03 | 0.03 | 0.03 | 0.03 | 0.03 |
| $a_2$ [mm] | 2.0 | 2.0 | 2.0 | 2.0 | 2.0 | 2.0 | 2.0 | 2.0 | 2.0 | 2.0 | 2.0 |
| $b_2$ [mm] | 1.5 | 1.5 | 1.5 | 1.5 | 1.5 | 1.5 | 1.5 | 1.5 | 1.5 | 1.5 | 1.5 |
| x | 1.0 | 1.0 | 1.0 | 1.0 | 1.0 | 1.0 | 1.0 | 1.0 | 1.0 | 1.0 | 1.0 |
| y | −1.8 | −1.5 | −1.4 | −0.8 | −0.6 | 0.0 | 0.2 | 0.6 | 0.8 | 1.4 | 1.8 |
| Residual strain level | 10 | 3 | 3 | 2 | 1 | 1 | 2 | 3 | 4 | 7 | 10 |
| Crack due to thermal shock | Present | Absent | Absent | Absent | Absent | Absent | Absent | Absent | Absent | Absent | Present |

With reference to Table 2 above, in Sample No. 1 as a comparative example, both preheating and annealing were not performed on a thin flat glass, and hence the thin flat glass had a residual strain level of 10. In addition, a crack due to thermal shock was formed. In contrast, in Samples Nos. 2 to 9 as the examples of the present invention, the second irradiation region (region irradiated with the annealing laser beam) overlapped so as to extend astride the first irradiation region (region irradiated with the fusing laser beam), and hence preheating and annealing were performed before and after fusing of the thin flat glass. Accordingly, the residual strain level was lowered in all of Samples Nos. 2 to 9, and the crack due to thermal shock was not formed. In particular, as in Samples Nos. 2 and 7 to 9, in a range satisfying $a_2/a_1 \geq 50$ and $b_2/b_1 \geq 30$, there was obtained such a highly satisfactory result that the residual strain level was 1.

With reference to Table 3 above, in Sample No. 10 as a comparative example, the second irradiation region protruded only in the front of the first irradiation region along the fusing propagating direction, and hence annealing was not performed on the thin flat glass after fusing, with the result that lowering of the residual strain level was not observed. Further, in Sample No. 20 as a comparative example, the second irradiation region protruded only in the rear of the first irradiation region along the fusing propagating direction, and hence preheating was not performed on the thin flat glass before fusing, with the result that the crack due to thermal shock was formed. In contrast, in Samples Nos. 11 to 19 as the examples of the present invention, the second irradiation region protruded in the front and the rear of the first irradiation region along the fusing propagating direction while overlapping the first irradiation region, and hence preheating and annealing were performed before and after fusing of the thin flat glass. Accordingly, the residual strain level was lowered in all of Samples Nos. 11 to 19, with the result that the crack level due to thermal shock was lowered.

With reference to Table 4 above, in Sample No. 21 as a comparative example, the second irradiation region was displaced to a product portion side of the thin flat glass without overlapping the first irradiation region, and hence thermal energy generated in the second irradiation region did not act on the first irradiation region. As a result, both the residual strain level and the crack level due to thermal shock were not lowered. Further, in Sample No. 31 as a comparative example, the second irradiation region was displaced to a non-product portion side of the thin flat glass without overlapping the first irradiation region, and hence the thermal energy generated in the second irradiation region did not act on the first irradiation region. As a result, similarly to Sample No. 21, both the residual strain level and the crack level due to thermal shock were not lowered. In contrast, in Samples Nos. 22 to 30 as the examples of the present invention, the second irradiation region overlapped the first irradiation region in a width direction orthogonal to the fusing propagating direction while protruding in the front and the rear of the first irradiation region along the fusing propagating direction, and hence effects of preheating and annealing acted on a portion of the thin flat glass to be fused. As a result, the residual strain level was lowered in all of Samples Nos. 22 to 30, and the crack due to thermal shock was not formed.

In particular, with reference to Tables 3 and 4, as in Samples Nos. 12 to 19 and Samples Nos. 22 to 30, in a range satisfying $-a_2/4 \leq x < a_2-a_1$ and $-b_2-b_1 < y \leq b_2/2$, it can be confirmed such a satisfactory result that the crack level due to thermal shock was lowered, and the residual strain level was 3 or less. Among Samples Nos. 12 to 19 and Samples Nos. 22 to 30, as in Samples Nos. 15 to 17 and Samples Nos. 25 and 26, in a range satisfying $1/4 \leq x/a_2 \leq 3/4$ and $-1/2 \leq y/b_2 \leq 0$, it can be confirmed such a highly satisfactory result that the crack due to thermal shock was completely absent, and the residual strain level was 1 or less.

REFERENCE SIGNS LIST 1 glass sheet cutting device
2 first laser irradiator
3 second laser irradiator
4 gas jet nozzle
AG assist gas
CL preset cutting line
G glass substrate
Ga product portion
Ga1 fused end surface
Gb non-product portion
LB1 fusing laser beam
LB2 annealing laser beam
SP1 first irradiation region
SP2 second irradiation region
SP2a region to be preheated
SP2b region to be annealed
S fusing gap
R1 fusing completed portion
R2 fusing uncompleted portion
θ azimuthal angle of annealing laser beam
φ polar angle of annealing laser beam

The invention claimed is:

1. A glass sheet cutting method, comprising:
   radiating a laser beam from above along a preset cutting line of a glass sheet; and
   fusing and dividing the glass sheet using the preset cutting line as a boundary,
   wherein the laser beam comprises:
      a fusing laser beam for fusing the glass sheet; and
      an annealing laser beam for annealing fused end surfaces of the glass sheet,
   wherein a jet nozzle for jetting assist gas to blow off molten foreign matter generated by the fusing is provided,
   wherein the glass sheet is fused and divided into a product portion and a non-product portion by the fusing laser beam,
   wherein the assist gas is jetted onto a region irradiated with the fusing laser beam from above on a product portion side, and
   wherein the annealing laser beam is obliquely radiated from above onto at least one of the fused end surfaces of the product portion through a gap that is formed between the fused end surfaces by the fusing.

2. The glass sheet cutting method according to claim 1, wherein a region irradiated with the annealing laser beam has an intensity distribution in which an intensity of thermal energy changes from a fusing execution portion to a fusing completed portion on the preset cutting line.

3. The glass sheet cutting method according to claim 2, wherein the annealing laser beam is inclined so as to come closer to the glass sheet from a fusing uncompleted portion side toward a fusing completed portion side on the preset cutting line or from the fusing completed portion side toward the fusing uncompleted portion side on the preset cutting line.

4. The glass sheet cutting method according to claim 3, wherein the annealing laser beam has an elliptical beam shape in cross-section orthogonal to an optical axis thereof.

5. The glass sheet cutting method according to claim 2, wherein the annealing laser beam has an elliptical beam shape in cross-section orthogonal to an optical axis thereof.

6. The glass sheet cutting method according to claim 2, wherein the region irradiated with the annealing laser beam is formed to overlap the region irradiated with the fusing laser beam so as to extend astride the region irradiated with the fusing laser beam.

7. The glass sheet cutting method according to claim 1, wherein the annealing laser beam is inclined so as to come closer to the glass sheet from a fusing uncompleted portion side toward a fusing completed portion side on the preset cutting line or from the fusing completed portion side toward the fusing uncompleted portion side on the preset cutting line.

8. The glass sheet cutting method according to claim 7, wherein the annealing laser beam has an elliptical beam shape in cross-section orthogonal to an optical axis thereof.

9. The glass sheet cutting method according to claim 7, wherein the region irradiated with the annealing laser beam is formed to overlap the region irradiated with the fusing laser beam so as to extend astride the region irradiated with the fusing laser beam.

10. The glass sheet cutting method according to claim 1, wherein the annealing laser beam has an elliptical beam shape in cross-section orthogonal to an optical axis thereof.

11. The glass sheet cutting method according to claim 1, wherein the region irradiated with the annealing laser beam is formed to overlap the region irradiated with the fusing laser beam so as to extend astride the region irradiated with the fusing laser beam.

12. The glass sheet cutting method according to claim 1, wherein the fusing laser beam and the annealing laser beam are formed through splitting a laser beam emitted from a single light source.

13. The glass sheet cutting method according to claim 1, wherein the fusing laser beam and the annealing laser beam are formed through emission from separate light sources.

14. A glass sheet cutting method, comprising:
   radiating a fusing laser beam and an annealing laser beam along a preset cutting line of a glass sheet; and
   fusing and dividing the glass sheet using the preset cutting line as a boundary,
   wherein a region irradiated with the annealing laser beam is set larger in dimension in a fusing propagating direction along the preset cutting line than a region irradiated with the fusing laser beam,
   wherein the region irradiated with the annealing laser beam overlaps the region irradiated with the fusing laser beam so as to extend astride the region irradiated with the fusing laser beam along the fusing propagating direction, and
   wherein the region irradiated with the fusing laser beam overlaps the region irradiated with the annealing laser beam on a front side in the fusing propagating direction with respect to a center position of the region irradiated with the annealing laser beam in the fusing propagating direction.

15. The glass sheet cutting method according to claim 14,
   wherein the glass sheet is fused and divided into a product portion and a non-product portion, and
   wherein a larger part of the region irradiated with the annealing laser beam is formed on a product portion side than on a non-product portion side.

16. The glass sheet cutting method according to claim 14, wherein the region irradiated with the annealing laser beam has an elongated shape along the fusing propagating direction.

17. The glass sheet cutting method according to claim 16, wherein the annealing laser beam is obliquely radiated onto a surface of the glass sheet.

18. The glass sheet cutting method according to claim 14, wherein the fusing laser beam and the annealing laser beam have different wavelengths.

19. The glass sheet cutting method according to claim 18, wherein the fusing laser beam and the annealing laser beam comprise laser beams oscillated by different oscillators.

* * * * *